March 9, 1971    J. M. GOSSEN    3,568,386
MOLDING CONSTRUCTION
Filed March 17, 1969
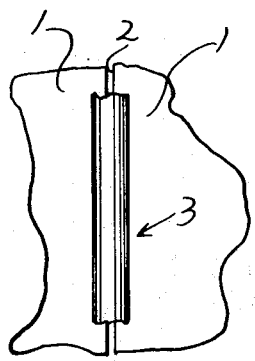
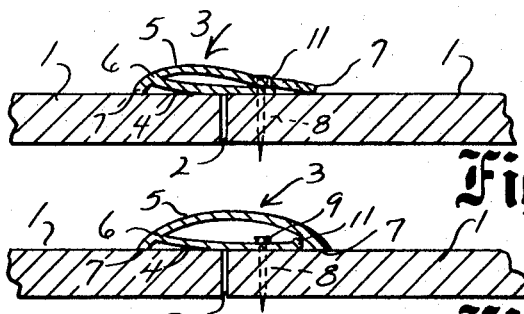
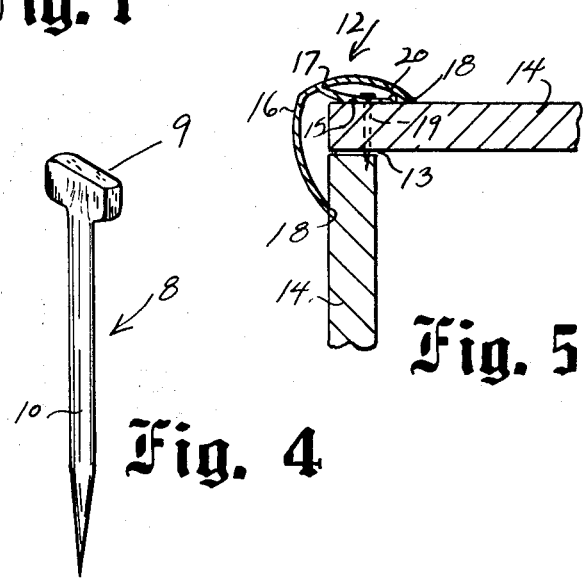
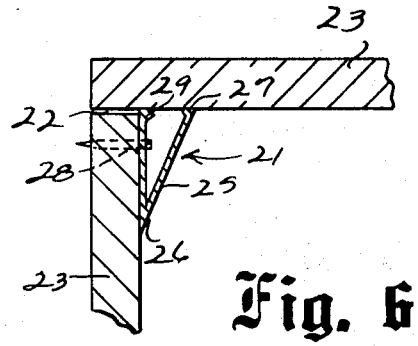
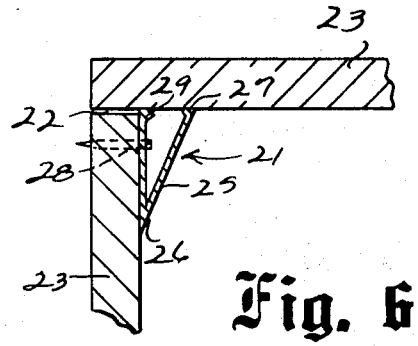
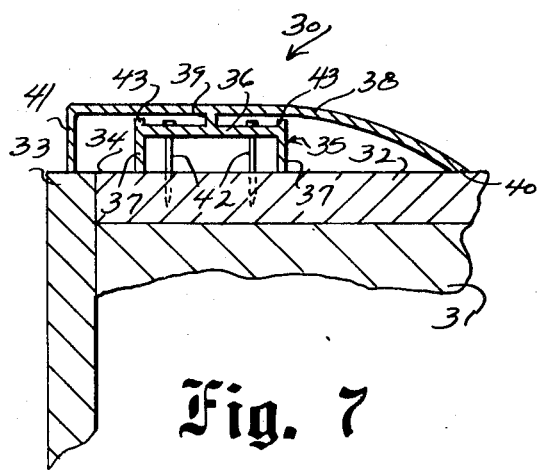
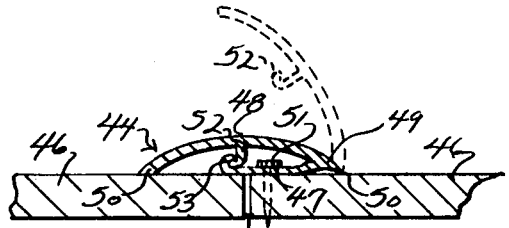
INVENTOR.
JOHN M. GOSSEN
BY
Attorneys

United States Patent Office 3,568,386
Patented Mar. 9, 1971

3,568,386
MOLDING CONSTRUCTION
John M. Gossen, 7645 N. Berwyn Ave.,
Milwaukee, Wis. 53209
Filed Mar. 17, 1969, Ser. No. 807,683
Int. Cl. E04f *19/02*
U.S. Cl. 52—288          10 Claims

ABSTRACT OF THE DISCLOSURE

A flexible plastic molding for covering the joints in building panels. The molding includes a base which covers the joint between the panels and a curved or convex outer section is connected along its side edge to the base. A fastener, such as nail, is driven through the curved outer section and connects the base to the panel. As the nail passes through the outer section, the outer section is deformed inwardly toward the base, and a projection or ridge on the base engages the deformed outer section and urges it outwardly to its original position after the nail has been driven through.

---

This invention relates to a plastic molding strip, and more particularly to a plastic molding strip employed to cover the joint between building panels.

When applying wall or ceiling panels, such as plywood, hardboard or plasterboard, the joint between adjacent panels is frequently covered by a molding strip. With plywood or woodgrain hardboard or plasterboard, the molding strip is normally provided with a wood grain finish similar to that of the panel so that from an appearance standpoint the molding blends into the panel. Moldings generally are of two types, those that are applied as the panels are attached to the wall, and those that are applied after the panels have been installed. The type of molding that is applied as the panels are attached has an H-shaped cross section with recesses in opposite side edges. The side edge of one panel is inserted within one of the recesses in the molding and after the panel is attached to the wall the side edge of a second panel is slipped into the opposite recess of the molding.

The more common type of molding is applied after the panel is installed and the molding is located entirely on the outside of the panels as a batten strip. Moldings of this type are useually formed of wood and prefinished to blend with the finish of the panel. With wood molding of this type, it is necessary to countersink the nails and fill the resulting holes. Plastic moldings have not been used extensively in this type of application because nails driven through the flexible plastic cause ripples between the nails which detracts from the appearance of the molding. Second, large head nails have been required to nail the plastic molding strips to the panels and, due to the fact that the plastic is relatively thin the nail heads cannot be countersunk. Thus, it has been the practice when using plastic molding to employ colored nails in an attempt to make the exposed nail heads less conspicuous.

The present invention is directed to a plastic molding strip to cover the joint between building panels which eliminates the inherent disadvantages of prior plastic moldings. According to the inventtion, the molding strip includes a base which is adapted to cover the joint between the panels, and a generally curved or convex outer section is connected to the base along one side edge, while the other side edge bears against the panel. To attach the molding to the panel, a thin-head nail is driven through the curved outer section and through the base into the panel. As the nail passes through the outer section, the outer section is deformed inwardly toward the base and engages a projection or ridge on the base. As the head of the nail is driven completely through the outer section, the outer section is urged outwardly to its original position by the ridge.

In the final installation, the nails are engaged merely with the base and are not connected to the outer section. Due to the fact that the outer section itself is not nailed to the panel there are no ripples or waves in the outer section. By virtue of the convex contour of the outer section and its connection to the base, the side edges of the outer section will bear tightly against the surface of the panels to completely enclose the joint.

The molding of the invention is self countersinking and no filling of nail holes is required. The nails are driven completely through the outer section and as the nails have thin heads, only thin slits are formed in the outer section. These nail slits can be filled by striking the nail with additional blows, with the result that the head of the nail tends to mash the area of the outer section bordering the nail slit so that the slit will be filled with the plastic material. As it is not necessary to fill or putty the nail holes, the time involved in applying the molding is substantially reduced over conventional types.

As a further advantage, the molding of the invention is very durable and can be extruded into any desired length, thereby reducing inventory and scrap over conventional wood molding.

The outer section of the molding can be provided with any desired wood grain finish or other finish to blend into the panelling to which it is attached.

Other objects and advantages will appear in the course of the following description.

The drawings illustrate the best mode presently contemplated of carrying out the invention.

In the drawings:

FIG. 1 is a plan view of the molding of the invention as applied to cover the joint between a pair of wall panels;

FIG. 2 is a transverse section showing the molding as applied to the panels with the outer section being deformed by the head of the nail;

FIG. 3 is a view similar to FIG. 2 showing the molding in the final form as applied to the panels;

FIG. 4 is a perspective view of a flathead nail which can be utilized to apply the molding to the panels;

FIG. 5 is a sectional view showing a modified form of the molding applied to an outside corner;

FIG. 6 is a sectional view of the second modified form of the molding applied to an inside corner;

FIG. 7 is a sectional view of a third modified form of the invention used as a door casing; and FIG. 8 is a sectional view of a fourth modified form of the invention utilizing a locking element to secure the outer section to the base.

FIG. 1 illustrates a pair of wall panels 1 which can be formed of plywood, hardboard, plasterboard, or the like, having a joint 2 therebetween, and a molding strip 3 is applied to the panels and covers the joint 2.

As best shown in FIGS. 2 and 3, the molding strip 3 is provided with a base section 4 which extends across the joint 2 and is connected to a curved outer section 5 having a generally convex contour. One side edge of the base 4 is integrally connected to the outer section 5 by a connection 6, and the connection 6 is spaced from the side edge 7 of the outer section.

The molding strip 3 is adapted to be formed of a flexible plastic material, such as polyvinyl chloride, or the like, and is formed by extruding into any desired length.

As shown in FIGS. 2 and 3, the molding is adapted to be secured to the panels by a series of nails 8 and in the final assembled form the heads of the nail 9 are in engagement with the base 4 to firmly hold the strip to the panels. The nails 8 are shown in FIG. 4 and including a generally thin or flattened head 9 and a stem 10 which terminates in a pointed tip.

In applying the molding strip, the nails 8 are driven through the outer section 5 and through the base 4 into the panel 1. As the nails are driven into the panels, the heads 9 of the nails engage the outer surface of section 5 and tend to deform the section 5 inwardly as shown in FIG. 2. The ridge or projection 11 formed along the side edge of the base 4 prevents the outer section 5 from being secured flatwise against the base, and as the heads 9 of the nails are relatively thin, continued pounding will drive the head 9 of the nail completely through the outer section. The natural resiliency of the outer section in conjunction with the ridge 11 acts to urge the outer section 5 outwardly to its original convex position as shown in FIG. 3.

Due to the thin nature of the nail head 9, the nail will form a slit in the outer section 5 and by striking the nail with additional blows when it is in the position shown in FIG. 3, the inner surface of the section 5 is mashed against the nail head which causes the soft plastic to flow and fill in the slit in the outer section. Thus, the molding is self-countersinking for the nails are driven completely through the outer section and, in addition, the nail holes or slits are self-filling for the slits are filled with plastic as the nail is subjected to several more blows when it is in the position as shown in FIG. 3. As it is not necessary to countersink the nails nor fill the nail holes, the labor involved in applying the molding is substantially reduced over conventional types.

FIG. 5 shows a modified form of the molding which is applied to an outer corner and this embodiment the molding 12 is employed to cover the joint 13 between a pair of panels 14. Molding 12 includes a base 15, similar to base 4, and a generally curved outer section 16 is integrally connected to the base as indicated at 17. Connection 17 is located between the side edges 18 of the molding which are disposed in engagement with the panels 14 after application of the molding.

As described with respect to the embodiment shown in FIGS. 1–3, the molding 12 is applied by a series of nails 19, similar to nails 8, which are driven through the outer section 16 and connect the base 15 to one of the panels 14. As previously described with respect to the first embodiment, the base 15 is provided with a ridge 20 which prevent the outer section 16 from being nailed flatwise to the base 15 and tends to urge the outer section 16 to its original position after the nail has been driven through the outer section.

FIG. 6 illustrates another modified form of the molding of the invention as applied to an inside corner. The molding 21 of this embodiment is adapted to cover the joint 22 between a pair of panels 23. Molding 21 includes a base 24 and an outer section 25 which are connected along their side edges by a hinge connection 26. The base 24 is secured flatwise to one of the panels while the outer side edge 27 of outer section 25 engages the other of the panels.

As in the case of the previous embodiment, the molding is connected to the panels 23 by a series of nails 28 which are driven completely through the outer section 25 and secure the base 24 to the panels 23.

A ridge 29 is formed on the base 24 and acts in the manner previously described to return the outer section 25 to its original position after the nails have been driven completely through the outer section.

FIG. 7 illustrates the use of the molding of the invention as a door casing 30. In this embodiment, a wall 31 is provided with a surface layer 32 of plaster, hardboard, panelling, or the like. A door jamb 33 is secured to the wall 31 bordering a doorway, and the casing 30 is adapted to enclose the joint 34 between the surface 32 and the jamb 33.

The casing is formed of a flexible plastic material, such as polyvinyl chloride, and is provided with a base section 35 including a web 36 and a pair of spaced flanges 37 which extend inwardly and bear against the surface 32. The base 35 is connected to a curved outer section 38 by a central longitudinal rib 39 which projects outwardly from the web 36 of the base.

One side edge 40 of the outer section 39 bears against the surface 32 while a flange 41 is provided on the opposite side edge and the end of the flange bears against the edge of the jamb 33.

The casing 30 is secured to the wall by a series of nails 42, similar to the nails shown in FIG. 4, the nails are driven through the outer section 39 and through the web 36 into the wall surface 32. As the nails are driven into the outer section, the heads 9 of the nails tend to deform the outer section inwardly and ridges 43 are provided on the side edges of the web 36 and engage the outer surface 38 as it is deformed inwardly by the nails. The ridges 43 prevent the outer section from being secured flatwise to the web 36, and as the nails 42 are driven completely through the outer section, the ridges 43 urge the outer section outwardly to its original contour.

FIG. 8 illustrates another form of the invention in which the molding 44 is used as a batten to cover the joint 45 between a pair of wall panels 46. The molding 44 includes a base 47 which is connected to a generally curved outer section 48 by hinge connection 49 which is located adjacent one of the side edges 50 of the outer section. The molding 44 is adapted to be connected to the panels 46 by a series of nails 51 which extend through only the base 47 into the panel.

To apply the molding strip 44, the outer section 48 is pivoted to the position shown by the phantom lines in FIG. 8 and the nails 51 are then driven through the base 47 into the panels. After applying the nails 51, the outer section 48 is pivoted or bent to its original position wherein both of the side edges 50 will be in engagement with the surface of the panel. To maintain the outer section 48 in the position shown by the full lines in FIG. 8, a locking mechanism is employed. The locking mechanism includes a hook-like locking element 52 which is located on the inner surface of the outer section and is adapted to engage a similar hook-like locking element 53 located on the base 47. By manually pressing the outer section 48 against the panels 46 after applying the nails 51, the locking elements 52 and 53 will engage to thereby hold the outer section firmly against the panels 46.

Due to the fact that the outer section 48 of the molding strip is not nailed directly to the supporting surface there are no ripples in the outer section which detract from the appearance of the molding.

The molding can be formed with any desired surface finish, such as a wood grain finish, to blend into the panels to which it is applied. As the molding is formed of flexible resilient plastic it is very durable and is resistant to cracking and marring. Due to the fact that the molding can be extruded in any desired length, the inventory and scrappage is reduced over that of wood molding.

While the above description has shown the use of nails as a fastening means, it is contemplated that any other mechanical fasteners or adhesives could be employed.

I claim:

1. In a structure, wall means having a joint therein, a plastic molding strip covering the joint, said molding strip including a base member adapted to engage said wall means and having a pair of side extremities, a flexible outer member connected to a first side extremity of the base member and having side edges disposed laterally outward of said base member and disposed in engagement with the wall means on opposite sides of the joint, said outer member having a central portion located between the side deges and spaced outwardly of the base member, connecting means for connecting the base member to the wall means with the connecting means being free of attachment to the outer member, a projection on one of said members and facing the other of said members and spaced laterally from the connection between said members, said projection disposed to engage the other of said members when the central portion of the outer member is deformed inwardly as the connecting means is driven into said central portion, said projection serving to urge said central portion outwardly to its original position as the connecting means is driven completely through said central portion, the position of engagement of said projection with the other of said members being spaced inwardly of the side edges of the outer member.

2. The structure of claim 1, wherein said connecting means comprises a nail.

3. The structure of claim 2 wherein said nail includes a relatively thin head capable of being driven completely through said central portion of the outer member.

4. The structure of claim 1, wherein said central portion is generally convex.

5. The structure of claim 1, wherein said projection is a ridge on said base member and located on the opposite side of the nail from the connection between said base member and said outer member.

6. The structure of claim 1, wherein said structure includes locking means for removably locking the second side extremity of the base member to the outer member, said locking means being spaced inwardly of the corresponding side edge of the outer member.

7. The structure of claim 6, wherein said locking means comprises interconnecting locking elements on the side edge of the outer member and the corresponding side edge of the base member.

8. The structure of claim 6, wherein the connection between the base member and the outer member is a hinge permitting the outer member to be pivoted with respect to the base member.

9. A plastic molding to be attached by a fastener to a supporting structure, comprising a flexible outer section having a first side edge and a second side edge with said side edges disposed to engage the supporting structure on either side of a joint in said structure, a base section having a pair of side extremities with one of said side extremities being connected to the outer section at a location spaced from the first side edge of the outer section and the opposite side extremity of the base section being spaced inwardly from the second side edge of the outer section, said outer section also including a central portion located between the side edges and spaced outwardly of said base section, a projection formed on said opposite side extremity of the base section and facing toward said outer section, said projection being engaged by the central portion of the outer section as the outer section is deformed by a fastener being driven therethrough and acting to urge the outer section to its original configuration.

10. The construction of claim 9, wherein said projection is a ridge which extends substantially the length of the molding.

References Cited

UNITED STATES PATENTS

| | | | |
|---|---|---|---|
| 985,367 | 2/1911 | Pitney | 52—313 |
| 1,884,440 | 10/1932 | Welch | 52—716X |
| 2,149,742 | 3/1939 | Miller | 52—716 |

FOREIGN PATENTS

| | | | |
|---|---|---|---|
| 1,372,447 | 1964 | France | 52—716 |

PRICE C. FAW, JR., Primary Examiner

U.S. Cl. X.R.

52—716